Jan. 23, 1968     R. L. McKINNEY     3,364,813
SELF-CALIBRATING DISPLACEMENT TRANSDUCER
Filed Sept. 6, 1963

BY

INVENTOR
ROYCE L. McKINNEY

ATTORNEYS

United States Patent Office 3,364,813
Patented Jan. 23, 1968

3,364,813
SELF-CALIBRATING DISPLACEMENT
TRANSDUCER
Royce L. McKinney, Newport News, Va., assignor to the United States of America as represented by the Administrator of the National Aeronautics and Space Administration
Filed Sept. 6, 1963, Ser. No. 307,271
2 Claims. (Cl. 88—14)

The invention described herein was made by an employee of the United States Government and may be manufactured and used by or for the Government for governmental purposes without the payment of any royalties thereon or therefor.

This invention relates to a self-calibrating displacement transducer and more particularly to a self-calibrating means for measuring the magnitude and frequency of displacement of a body.

A prior method used to determine the displacement of a body without influencing that displacement involved the use of an electric coil located near the surface of the body. Any displacement of the body caused the inductance of the coil to vary and thereby allow the detection of the displacement by the use of a suitable electric circuit containing the coil. One of the disadvantages of this particular method is that each coil used must be calibrated prior to use. Also in use these coils have a highly nonlinear output; consequently, the use of a graphical method is required to determine the magnitude of displacement of a body.

It is therefore a primary object of this invention to provide a displacement transducer which does not require calibration prior to its use.

Another object of this invention is to provide a displacement transducer which will measure the magnitude and frequency of displacement of a body.

A further object of this invention is to provide a displacement transducer which will measure the displacement of a body along a straight line.

A still further object of this invention is to provide a displacement transducer which will measure the angular displacement of a body.

In the present invention the displacement transducer consists of a light source which produces a narrow beam of light, a reflecting surface attached to the body whose displacement is to be measured, a transparent medium with nontransparent, parallel, uniformly spaced lines thereon, a variable density optical filter, a photoelectric detector and a recorder. The variable density optical filter is located relative to the transparent medium such that a beam of light that passes through the transparent medium will also pass through the filter and such that the density of the filter varies in a direction transverse to the lines on the transparent medium. The photoelectric detector intercepts the light beam that passes through the transparent medium and filter, and produces a voltage or current proportional to the intensity of this light beam. A recorder is connected to the photoelectric detector for producing a graph of the voltage or current produced by the detector. The narrow beam from the light source strikes the reflecting surface so that it is reflected onto the transparent medium and so that the plane that contains both the beam from the light source and the reflected beam is transverse to the lines on the transparent medium. When the body is displaced the reflected beam scans the transparent medium which caused the beam to be modulated by the lines on the transparent medium and the filter. This modulated beam is picked up by the photoelectric detector and recorded by the recorder.

There are two disclosed embodiments of the present invention. The first embodiment measures the displacement of a body along a straight line, and the second embodiment measures the angular displacement of a body.

Other objects and advantages of this invention will further become apparent hereinafter and in the drawings, in which.

Figure 1:
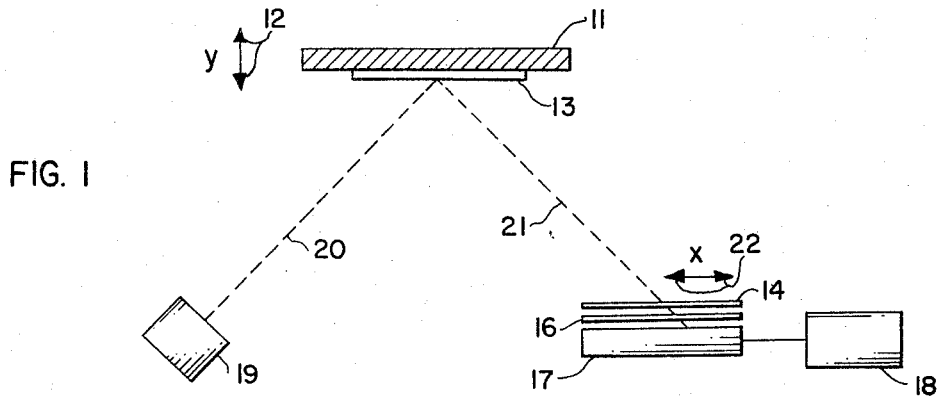
FIG. 1 shows a first embodiment of this invention which measures the magnitude and frequency of displacement of a body along a straight line.

In describing the preferred embodiments of the invention illustrated in the drawings, specific terminology will be resorted to for sake of clarity. However, it is not intended to be limited to the specific terms so selected, and it is to be understood that each specific term includes all technical equivalents which operate in a similar manner to accomplish a similar purpose.

Turning now to FIG. 1, there is disclosed a first specific embodiment of the invention selected for illustration. The number 11 designates the body whose displacement is to be measured. Body 11 moves in a straight line along a Y axis as indicated by arrows 12. The force that causes body 11 to be displaced is not disclosed since this invention is concerned only with the measurement of displacement of body 11. Body 11 can be displaced by any force and its displacement along the Y axis can be measured. Attached to body 11 is a reflecting surface 13, such as a flat mirror, which will reflect any light beam that strikes it.

Figure 2:
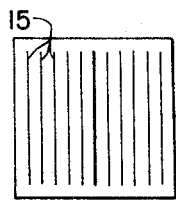
FIG. 2 shows a plan view of the transparent medium with lines thereon used in FIG. 1.
Figure 3:
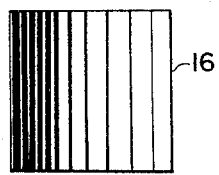
FIG. 3 shows a plan view of the variable density optical filter used in FIG. 1.

Number 14 designates a transparent medium, a plan view of which is shown by FIG. 2. Located on the surface of transparent medium 14 are nontransparent lines 15. These lines 15 are parallel and uniformly spaced across transparent medium 14. The opacity, spacing, and width of lines 15 are determined by the specific application of the transducer. One of the lines 15 is wider than the other lines to mark a reference point. A variable density optical filter 16, a plan view of which is shown in FIG. 3, is placed directly under the transparent medium 14. The direction in which the density of filter 16 varies is perpendicular to lines 15. A photoelectric detector 17 intercepts any light beam penetrating both transparent medium 14 and filter 16, and generates a voltage or current proportional to the intensity of this light beam. Any suitable recorder 18 is connected to detector 17 to produce a graph of the voltage or current generated by the detector.

A light source 19 produces a narrow beam of light 20 which strikes reflective surface 13 to produce a reflected light beam 21 that penetrates the transparent medium 14. The plane containing beams 20 and 21 is perpendicular to lines 15 on transparent medium 14.

Figure 4:
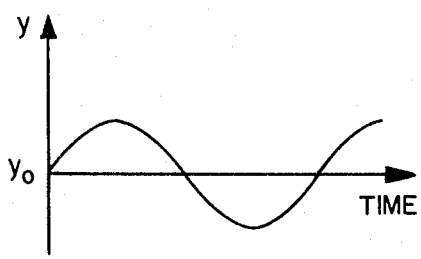
FIG. 4 shows a graph of a sinusoidal motion of the body whose displacement is to be measured, assumed for the purpose of description of operation of the embodiment disclosed in FIG. 1.
Figure 5:
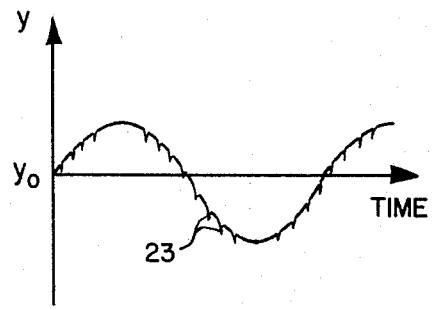
FIG. 5 shows a graph of the intensity of a beam of light which has been reflected by the reflecting surface and modulated by both the filter and the lines on the transparent medium in FIG. 1 when the body whose displacement is to be measured has a sinusoidal motion shown by FIG. 4.

The operation of the embodiment disclosed in FIG. 1 will now be described. For purposes of description of operation assume body 11 to be moving in the Y direction with a sinusoidal motion whose mean is $Y_o$. A graph of this motion is shown by FIG. 4. This motion of body 11 will cause reflected beam 21 to scan transparent medium 14 with a sinusoidal motion in an X direction indicated by arrows 22, about some mean Xo. This means Xo or reference point is marked by the wide line 15. The motion in the X direction of beam 21 will cause a sinusoidal variation in the intensity of the beam passing through variable density optical filter 16 and a corresponding variation in the output of photoelectric detector 17. When the light beam crosses one of the lines 15 on transparent medium 14 the intensity of the light beam will decrease causing a corresponding decrease in the output of photoelectric detector 17 as shown by FIG. 5. This output is recorded by recorder 18. The dips 23 are caused by lines 15. The number of dips between a maximum and a minimum of the sinusoidal output is equal to the number of lines 15 that light beam 21 crossed between the maximum and minimum displacement of body 11. A knowledge of this number of dips and the geometry of the arrangement shown in FIG. 1 then allows the calculation of the amplitude of the displacement of body 11. The frequency of displacement of body 11 is the frequency of the sinusoidal output.

It should be noted that the embodiment shown in FIG. 1 will operate without modulating light beam 21 by the lines 15. In other words, transparent medium 14 could be omitted. However, the device must then be calibrated since the output will be nonlinear due to nonlinearities in filter 16 and photoelectric detector 17. These nonlinearities do not affect the accuracy of the device when light beam 21 is modulated by lines 15, since light beam 21 will always cross the same number of lines 15 for any given displacement of body 11. Therefore, the embodiment shown in FIG. 1 does not have to be calibrated prior to use.

Figure 6:
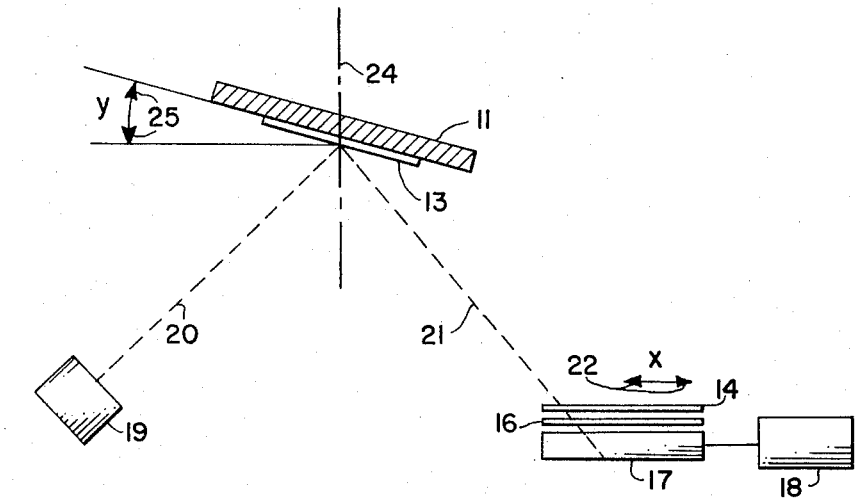
FIG. 6 shows a second embodiment of this invention which measures the angular displacement of a body.

A second embodiment of this invention is shown in FIG. 6. This embodiment is the same as the embodiment shown in FIG. 1 except it is used to measure the angular displacement of body 11. Body 11 pivots about some axis 24 in a direction indicated by arrows 25. Otherwise, its operation is the same.

The advantages of this displacement transducer are numerous. It has the advantage of not having to be calibrated prior to its use. It can be adapted to measure the displacement of any size body to any accuracy desired. It was especially developed to measure panel flutter displacements; however, it is not limited to this application.

It is to be understood that the forms of the invention herewith shown and described are to be taken as preferred embodiments. Various changes may be made in the scope, size, and arrangements of parts. For example, equivalent elements may be substituted for those illustrated and described herein, parts may be reversed, such as light source 19 and reflective surface 13, and certain features of the invention such as, the combination of lines 15 and filter 16 may be utilized independently of the use of other features, all without departing from the spirit or scope of the invention as defined in the following claims.

What is claimed as new and desired to be secured by Letters Patent of the United States is:

1. A displacement transducer for measuring the magnitude and frequency of displacement of a body comprising: a transparent medium with nontransparent, uniformly spaced parallel lines running across a surface of the transparent medium; a variable density filter positioned in a plane substantially parallel to said transparent medium such that its density varies in a direction transverse to said lines and such that a beam of light that scans said transparent medium in a direction transverse to said lines will pass through the transparent medium and filter; means for simultaneously scanning said transparent medium and variable density filter with a narrow light beam in a direction transverse to said lines in accordance with the displacement of said body; photoelectric means for receiving said narrow light beam and producing signal means; and means for producing a graph of the intensity of said signal means whereby the magnitude and frequency of displacement of said body can be determined from said graph.

2. A displacement transducer for measuring the magnitude and frequency of displacement of a body comprising: a transparent medium with nontransparent, uniformly spaced parallel lines running across a surface of the transparent medium; a variable density filter positioned in a plane substantially parallel to said transparent medium such that its density varies in a direction transverse to said lines and such that a beam of light scans said transparent medium in a direction transverse to said lines and passes through the transparent medium and filter; a reflective surface attached to said body; a light beam source located such that its beam of light strikes said reflective surface and is reflected onto the said transparent medium and such that the plane of the beam of light from the light source and the reflected beam is transverse to the lines on the transparent medium, whereby when said body is displaced said reflected light beam simultaneously scans across said transparent medium and said variable density filter; photoelectric means for receiving said reflected light beam and producing signal means; and means for producing a graph of the intensity of said signal means indicative of the magnitude and frequency of displacement of the body.

References Cited

UNITED STATES PATENTS

| 2,007,010 | 7/1935 | Theare | 88—14 |
| 3,245,304 | 4/1966 | Davis | 88—14 |
| 3,285,123 | 11/1966 | Rantsch et al. | 88—14 |

FOREIGN PATENTS

| 1,340,093 | 9/1963 | France. |

JEWELL H. PEDERSEN, *Primary Examiner.*

A. A. KASHINSKI, *Assistant Examiner.*